United States Patent [19]

Riehl, Jr.

[11] Patent Number: 5,101,840
[45] Date of Patent: Apr. 7, 1992

[54] DYE FOR CIGARETTE WRAPPER PAPER AND CIGARETTE HAVING DYED WRAPPER

[75] Inventor: Tilford F. Riehl, Jr., Macon, Ga.

[73] Assignee: Brown & Williamson Tobacco Corporation, Louisville, Ky.

[21] Appl. No.: 565,843

[22] Filed: Aug. 13, 1990

[51] Int. Cl.$^5$ .............................................. A24D 1/02
[52] U.S. Cl. .................................... 131/365; 162/139
[58] Field of Search .......................... 131/365; 162/139

Primary Examiner—V. Millin
Attorney, Agent, or Firm—Charles I. Sherman

[57] ABSTRACT

A dye coating for a cigarette wrapper paper and a cigarette utilizing said wrapper wherein the dye comprises a solvent system, cocoa powder as the pigment, a dispersant to disperse the pigment, and a binder to bond the pigment to the paper when the dye is dry.

15 Claims, 1 Drawing Sheet

DYE FOR CIGARETTE WRAPPER PAPER AND CIGARETTE HAVING DYED WRAPPER

BACKGROUND OF THE INVENTION (a) Field of the Invention

The present invention relates to dyes, and more particularly to a dye coating for a cigarette wrapper paper including cocoa as the dye. The present invention further relates to a cigarette having a paper wrapper coated with a cocoa dye.

(b) Description of the Prior Art

It is known to dye cigarette wrapper paper using humic acid salts. However, such salts generally interfere with the desired taste of the cigarette. Other materials have also been tried as dyes, but for one reason or another have been found to be unacceptable for use in a cigarette.

It is an overall objective of the present invention to provide a dye for a cigarette wrapper which does not affect the taste of the tobacco. It is an objective of the present invention to provide a dye particularly useful for dying a cigarette wrapper paper using cocoa as the pigment. It is a further objective of the present invention to provide a cigarette having a paper wrapper circumscribing the tobacco rod which is dyed brown with a dye having cocoa powder as the pigment.

SUMMARY OF THE INVENTION

The present invention provides a dye coating for a cigarette wrapper paper comprising a solvent system, cocoa powder as a pigment, a dispersant to disperse the pigment, and a binder to bond the pigment to the paper when the coating is dry.

The present invention further provides a cigarette having a tobacco rod, and a paper wrapper dyed with a dye comprising a solvent system, cocoa powder as a pigment, a dispersant to disperse the pigment, and a binder to bond the pigment to the wrapper paper when the coating is dry.

BRIEF DESCRIPTION OF THE INVENTION

A better understanding of the present invention will be had upon reference to the following description in conjunction with the accompanying Figure which illustrates a conventional cigarette having a paper wrapper embodying the present invention.

DETAILED DESCRIPTION OF THE PREFERRED EMBODIMENT

Figure 1:
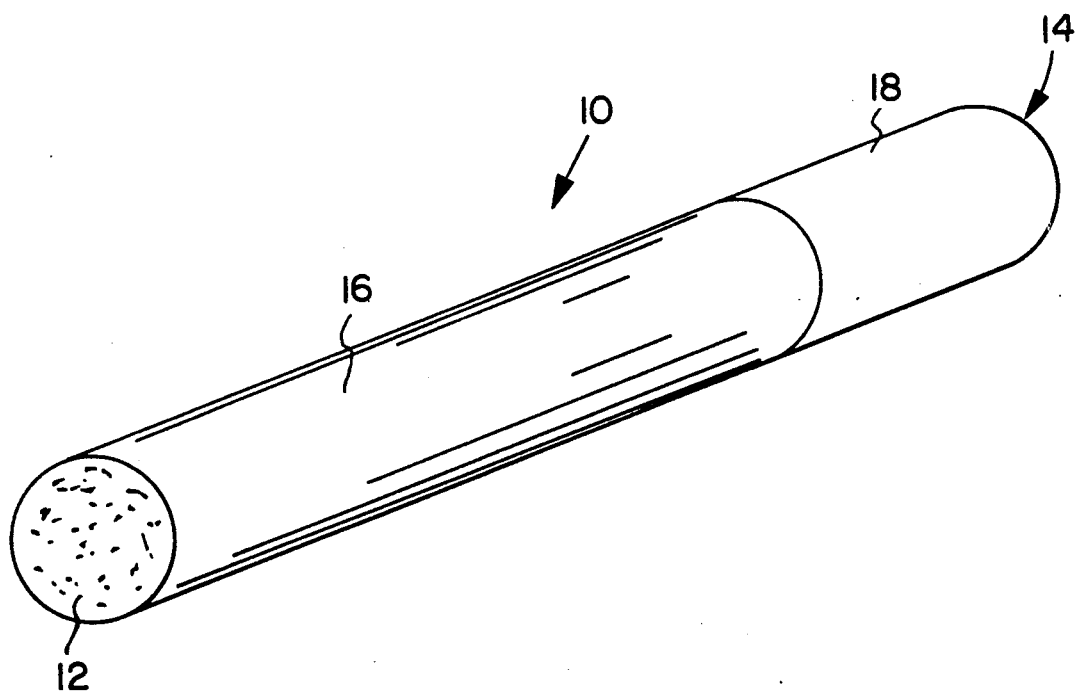

The present invention provides a dye coating derived from natural material for dying cigarette wrapper paper, and mole particularly such a dye having cocoa powder as a dye pigment.

The dye of the present invention comprises a solvent system cocoa powder as a pigment, a dispersant to disperse the pigment, and a binder to bond the pigment to the paper when the coating is dry. Generally the ratio of components in the d is from about 32 to 86 parts by weight of the solvent system, from about 4 to 8 parts by weight of the binder, from about 0 to 3 parts by weight of the dispersant, and from about 10 to 60 parts by weight of cocoa powder. Preferably, the ratio of components in the dye is from about 55 to 65 parts by weight of the solvent system, from about 4.5 to 6.5 parts by weight of the binder, from about 1 to 2 parts by weight of the dispersant, and from about 30 to 35 parts by weight of cocoa powder.

In one preferred embodiment, the dye coating has a solvent system comprising 48 weight percent alcohol and 12 weight percent isopropyl acetate, a binder comprising 5.5 weight percent ethyl cellulose, a dispersant comprising 1.5 weight percent lecithin, and 33 weight percent cocoa powder. A preferred alcohol is isopropyl alcohol.

In another preferred embodiment, the coating dye has a solvent system including a solvent comprising 48 weight percent alcohol and 12 weight percent isopropyl acetate, a binder comprising 4.5 weight percent ethyl cellulose and 1 weight percent nitrocellulose, a dispersant comprising 1.5 weight percent lecithin and 33 weight percent cocoa powder.

Solvents which may be used in the solvent system of the present invention include isopropyl alcohol, and isopropyl acetate as well as, for example, ethyl alcohol, ethyl acetate, n-propyl acetate, butyl acetates, heptane, hexane, or mixtures thereof. Generally, the ratio of alcohol to acetate, is from about 0 to 20 parts by weight alcohol to from about 80 to 100 parts by weight acetate.

Binders which may be used in the present invention include, for example, ethyl cellulose, nitrocellulose, sodium carboxymethyl cellulose and other cellulose gums.

Dispersants which may be used in the present invention include lecithin and the like.

Cocoa powder is typically used as a food and is prepared by pulverizing the material remaining after part of the cocoa butter is removed from chocolate liquor.

Commercially available cocoa powders can be treated with alkali or "Dutched" to darken its color. Cocoa powder not treated with alkali is referred to as natural cocoa. Natural cocoa has a pH of about 5.4 to 5.8, and alkali processed cocoa or "Dutched Cocoa" has a pH of from about 6 to as high as 8.5.

The dye of the present invention comprises either alkali treated cocoa powder, or natural cocoa powder as the pigment.

The dye coating of the present invention can be made in various ways. One preferred method is to dissolve the binder in the solvent system while mixing, then adding the dispersant and pigment with high shear mixing to disperse the pigment in the solution.

The dye coating can be applied to the cigarette wrapper paper by various methods. The preferred method is to use the Gravure process, which is well known in the printing industry, because of its high speeds.

Now with reference to the Figure, there is shown a typical cigarette 10 which includes a tobacco column 12 having a filter 14 coaxially located on one of its ends. The tobacco column 12 is circumferentially enclosed by a tobacco column wrapper paper 16, and the filter 14 is circumferentially enclosed by tipping paper 18 which Circumferentially overlaps the tobacco column wrapper 16 at the interface of the filter 14 and tobacco column 12. The wrapper paper 16 is dye coated to a brown color using the dye discussed above.

The foregoing detailed description is given primarily for clearness of understanding and no unnecessary limitations are to be understood therefrom for modifications will become obvious to one skilled in the art upon leading this disclosure and may be made without departing from the spirit of the invention and scope of the appended claims.

What is claimed is:

1. A dye coating for a cigarette wrapper paper comprising:
   a solvent system;
   cocoa powder as a dye pigment;
   a dispersant to disperse the pigment; and,
   a binder to bond the pigment to the paper when the coating is dry.

2. The dye coating of claim 1, wherein the solvent system comprises about 60 weight percent of the dye.

3. The dye coating of claim 1, wherein the solvent system comprises alcohol.

4. The dye coating of claim wherein the solvent system further comprises isoproyl acetate.

5. The dye coating of claim 4, wherein the alcohol comprises about 12 weight percent of the coating, and the isopropyl acetate comprises about 48 weight percent of the coating.

6. The dye coating of claim 1, wherein the dispersant comprises about 1.5 weight percent of the coating.

7. The dye coating of claim 1, wherein the dispersant comprises lecithin.

8. The dye coating of claim 1, wherein the dispersant comprises about 5.5 weight percent of the coating.

9. The dye coating of claim 1, wherein the binder comprises ethyl cellulose.

10. The dye coating of claim 9, wherein the binder further comprises nitrocellulose.

11. The dye coating of claim 10, wherein the ethyl cellulose comprises about 4.5 weight percent of the coating, and the nitrocellulose comprises about 1 weight percent of the coating.

12. The dye coating of claim 1, wherein the cocoa powder comprises about 33 weight percent of the coating.

13. The dye coating of claim 1, wherein the cocoa powder is natural cocoa.

14. The dye coating of claim 1, wherein the cocoa powder is alkali treated.

15. A cigarette comprising:
   (a) a tobacco column; and,
   (b) a wrapper paper circumscribing the tobacco column, the paper being dyed with a dye coating comprising
   a solvent system;
   cocoa powder as a dye pigment;
   a dispersant to disperse the pigment; and,
   a binder to bond the pigment to the paper wrapper when the dye is dry.

* * * * *